United States Patent [19]
Stiles

[11] Patent Number: 6,011,560
[45] Date of Patent: Jan. 4, 2000

[54] METHOD AND SYSTEM FOR COMMUNICATING THE STATUS OF A PROCESS IN A COMPUTER SYSTEM

[76] Inventor: Ian James Stiles, 353 S. 100 East, Salem, Utah 84653

[21] Appl. No.: 08/828,624

[22] Filed: Mar. 31, 1997

[51] Int. Cl.[7] .................................................. G06T 11/00
[52] U.S. Cl. ............................................................ 345/441
[58] Field of Search .................................... 345/441, 433, 345/442, 443, 326

[56] References Cited

U.S. PATENT DOCUMENTS

| | | | |
|---|---|---|---|
| 4,263,647 | 4/1981 | Merrell et al. | 364/101 |
| 4,851,998 | 7/1989 | Hospodor | 364/300 |
| 4,868,782 | 9/1989 | Lawrence et al. | 364/900 |
| 5,115,495 | 5/1992 | Tsuchiya et al. | 395/200 |
| 5,150,117 | 9/1992 | Hamilton et al. | 340/973 |
| 5,293,377 | 3/1994 | Gould | 370/94.1 |
| 5,323,393 | 6/1994 | Barrett et al. | 370/85.8 |
| 5,386,525 | 1/1995 | Noack | 395/400 |
| 5,463,552 | 10/1995 | Wilson, Jr. et al. | 364/436 |
| 5,481,707 | 1/1996 | Murphy, Jr. et al. | 395/650 |
| 5,542,047 | 7/1996 | Armstrong | 395/200.11 |
| 5,566,339 | 10/1996 | Perholtz et al. | 395/750 |
| 5,631,825 | 5/1997 | van Weele et al. | 364/188 |

*Primary Examiner*—Almis R. Jankus
*Attorney, Agent, or Firm*—Lloyd W. Sadler

[57] ABSTRACT

A device and method for displaying the status of programs or processes in a computer system is described. The device is designed to communicate the status to the user in an intuitive manner with four configurations indicating: process running normally, process running intermittently, process stopped normally, and process halted unexpectedly. The device when properly used by the method combine to form a communications device which clearly and easily communicates to the user of the computer system the operational status of the selected program, routine or process and does so without requiring the allocation of significant continuous processing overhead.

6 Claims, 3 Drawing Sheets

Microfiche Appendix Included
(1 Microfiche, 24 Pages)

METHOD AND SYSTEM FOR COMMUNICATING THE STATUS OF A PROCESS IN A COMPUTER SYSTEM

BACKGROUND OF THE INVENTION

1. Field of the Invention

This invention relates generally to computer systems, particularly computer systems capable of operating one or more tasks or processes simultaneously. Specifically this invention relates to the method for communicating the status of such tasks or processes operating in a computer system. Also, this invention still more specifically relates to a means for communicating that a process is running, stopped, running intermittently, or has unexpectedly halted. Furthermore, this invention relates to devices for displaying or communicating the status of processes within a computer which convey the appearance of motion without requiring the processing overhead of animations. For the purposes of this patent application, computer system is defined as one or more computational devices, employing processing units and methods of communicating data between such processing units. Such a computer system may be a single "stand-alone" computational device or a "network" of more than one computational device.

Providing a method of communicating the status of a process within a computer is essential to the development, use and quality assurance of computer software and its processes. However, a monitor device that remains static even when the process has halted provides misleading information and a monitor device that is continually animated uses valuable processing cycles within the computer, such use of processing cycles is often unacceptable and self-defeating. For example, it is often necessary to know how much of the processing power of a computer is being used by a particular process, and to simultaneously know whether that particular process is still operating. Continuously animated monitor devices will generally give misleading information under these conditions.

An alternative is to have no process monitor at all. Such an approach means that the user of the computer system will be left without any information as to whether a requested computer process is running or has stopped. Failing to have process status information is particularly troublesome where the process is expected to take a not insignificant amount of time. Examples of such processes are: data base searches, complex mathematical or modeling functions, network (including Internet) searches and access, electronic communication, saving, restoring, disk media back-up and other disk operations.

2. Description of Related Art

Computer status monitors are well known in the prior art. Such examples as a moving bar, a series of dots, a hourglass, a clock or a flashing curser are well established. Status monitors of other electronic devices are similarly well known, including the following examples: flashing or strobing lights, panels of light emitting diodes, liquid crystal display devices, mechanical toggle indicators, transparent or semi-transparent panels the permit visual access to the interior of a device whose motion itself give some indication of activity. However, the applicant knows of no computer process monitor which is designed to present the appearance, thereby communicating, of activity without requiring significant processing resources for its maintenance. Moreover, the applicant is unaware of a computer status monitor which is specifically designed to present a view of the operation of a specific computational process as opposed to the operation of the computer.

SUMMARY OF THE INVENTION

It is desirable to provide a method of communicating the status of a process operating within a computational device, which when used eliminates the uncertainty of the computer user in determining whether a requested program or process is operating, halted or is running only with some difficulty. Furthermore, it is desirable to have a computer status monitor which operates without adversely affecting the system performance of the computer. It is also desirable to have a computer process status monitor which communicates in an intuitive manner communicating the status of selected processes independently as opposed to providing only some potentially misleading information as to the operating status of the total computer system.

Accordingly, it is a primary object of this invention to provide a method of communicating the operational status of a program or process operating within a computer system which informs the user in an intuitive manner whether a specific process or group of processes are running, stopped, running with difficulty, or unexpectedly halted.

Another object of this invention is to provide a method of communicating the operational status of a program or process operating within a computer system which does not require continuous processing overhead.

A further object of this invention is to provide a displayable device which communicates by giving the appearance of motion when a process is running, by giving the appearance of jerky motion when a process is running with difficulty, by giving the appearance of lack of motion when a process is stopped, and by giving the appearance of being broken when a process has unexpectedly halted.

MICROFICHE APPENDIX

This specification includes a Microfiche Appendix which includes 1 page of microfiche with a total of 24 frames. The microfiche appendix includes computer source code of one preferred embodiment of the invention. In other embodiments of the invention, the inventive concept may be implemented in other computer code, in computer hardware, in other circuitry, in a combination of these, or otherwise. The Microfiche Appendix is hereby incorporated by reference in its entirety and is considered to be a part of the disclosure of this specification.

A still further object of this invention is to provide a device that can be assigned to a specific program or process to display the status of that particular program or process.

These and other objects of this invention, which will be clear to those of ordinary skill in the art upon review of this patent specification and claims, are achieved by an invention which permits the display of status information using a static device which is designed to be easily modifiable to reflect and to communicate the status of one or more processes within a computer system.

DETAILED DESCRIPTION OF THE INVENTION

Figure 1A:
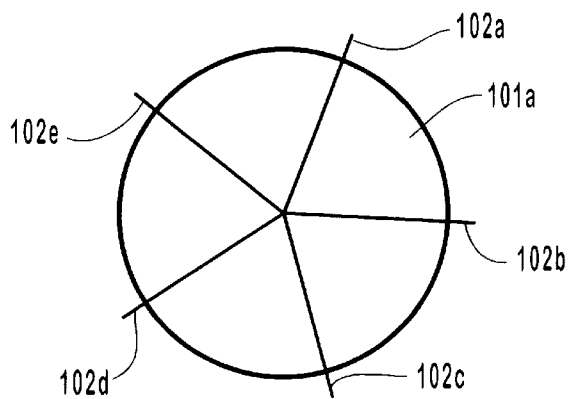
FIG. 1 depicts the preferred embodiment of the displayable communications device that is the best mode of this invention.
Figure 1B:
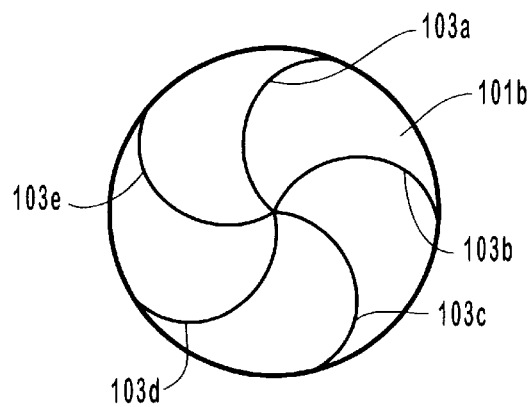
Figure 1C:
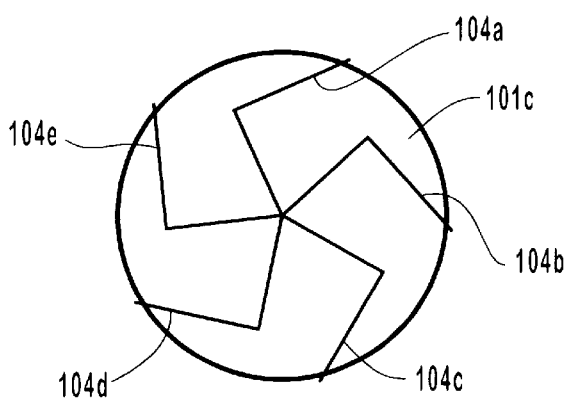
Figure 1D:
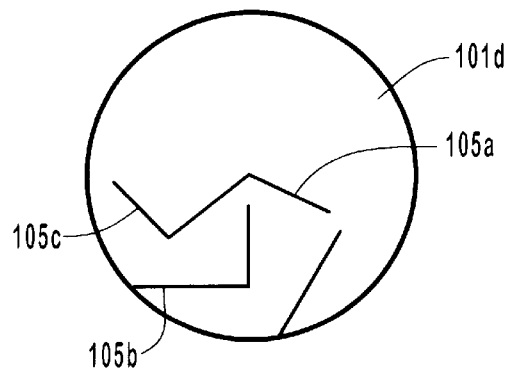

This invention provides a method and device for communicating the operational status of programs or processes operating within a computer system. Computer system is defined by the applicant to include one or more computational devices capable of executing prearranged instructions wherein said computational devices include one or more processing units. The method of the invention employs the device of the invention in combination with a computer system to communicate to the user the status of the programs or processes which may currently be executing within the computer system. When the invention is properly employed the user will be provided important status information about on-going, stopped and/or halted processes within the computer system processing environment.

FIG. 1 shows the preferred embodiment of the displayable device of the invention. In its preferred embodiment the device includes four alternative configurations 100a, 100b, 100c, 100d which are displayed to the user depending on the status of the process or program being monitored. The first configuration 100a is displayed on the computer display device to communicate that the indicated process is stopped. This configuration is composed of a generally circular feature 101a and five leg elements 102a–e. Each leg element 102 originates at the center of the generally circular feature 101a and extends a set amount beyond the circle feature 101a. Each leg element 102a–e is equally spaced radially from the center of the circular feature 101a.

The second configuration 100b is displayed on the computer display device to indicate that the program or process is running. This configuration is comprised of a second generally circular feature 101b and five spiral elements 103a–e. Each spiral element 103 originates at the center of the generally circular feature 101b and curves out to the inner edge of the circular feature 101b. Each spiral element 103 is equally spaced radially from the center of the circular feature 101b.

The third configuration 100c is displayed on the computer display device to indicate that the program or process is running intermittently. This configuration is composed of a third generally circular feature 101c and five bent elements 104a–e. Each of the bent elements 104 originates at the center of the generally circular feature 101c and extend to the inner edge of the circular feature. Each bent element 104 has a consistent bend angle and is equally spaced apart, extending somewhat radially from the center of the circular feature 101c.

The fourth configuration 100d is displayed on the computer display device to communicate that the indicated process or program unexpectedly halted. This configuration is composed of a fourth generally circular feature 101d and several segments of leg elements 105a–c. Each leg element 105 is displayed in one of several ways to appear incomplete. For example leg element 105a starts at the center of the generally circular feature 101d but does not reach the inner edge of that feature 101d. While, 105b reaches the edge of the circular feature 101d but does not quite originate at the center of the circular feature 101d. And 105c, while originating at the center and reaching the edge of the circular feature 101d is broken in or near its center, appearing to be two separate segments.

Figure 2:
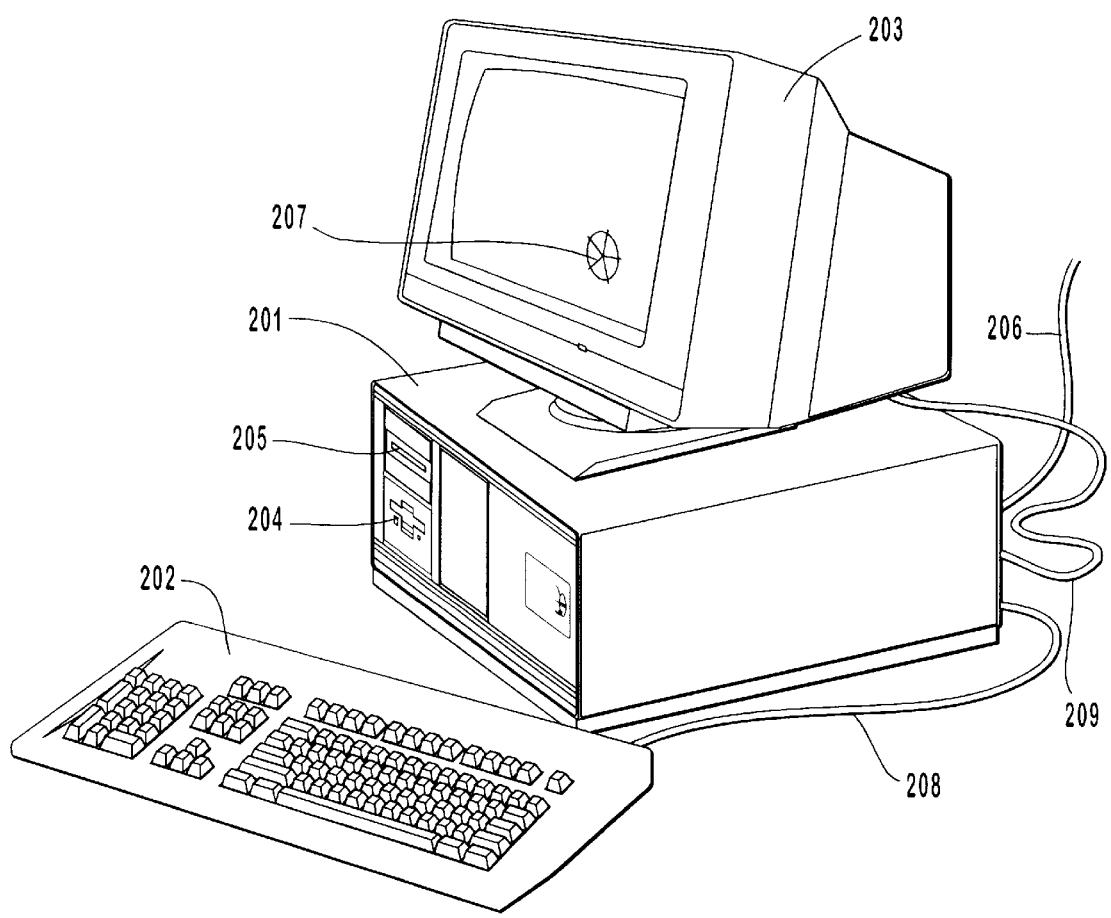
FIG. 2 depicts a typical computer system on which the invention operates.

FIG. 2 shows a typical computer system on which this invention operates. The computer includes a central processing unit 201 attached to an input device 202 through a communications cable or channel 208 and a display device 203 connected to the central processing unit through a cable or channel 209. A connection 206 is shown connecting the computer to one or more remote processors. Such a connection 206 is typically a modem line, network line or peripheral cable. Also, shown is the device of the invention 207 being displayed on the display device 203 in a manner easily observable by the user.

Figure 3:
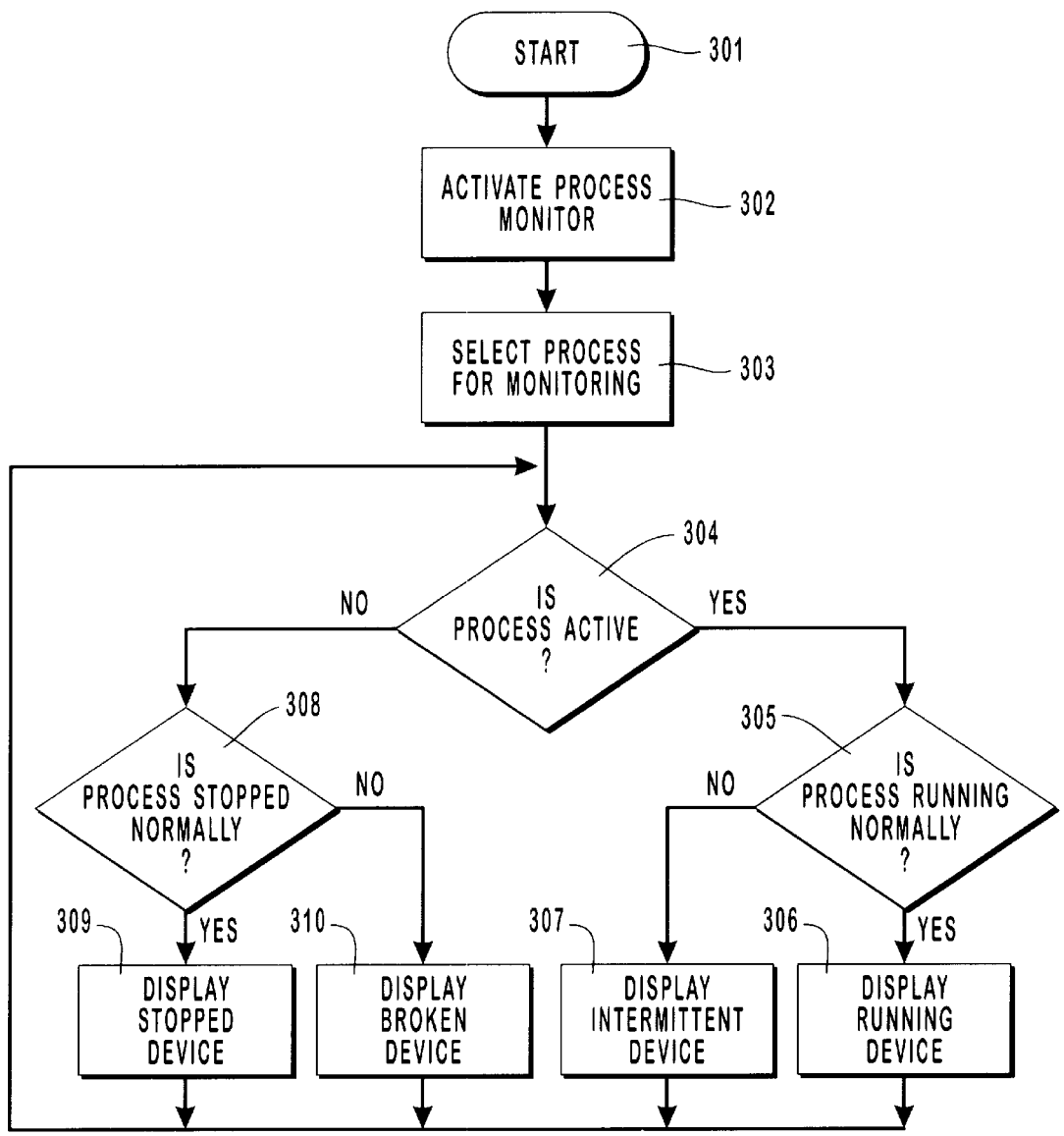
FIG. 3 depicts the steps of the process or method of the invention.

FIG. 3 shows the method or process steps of the invention. First, the process of the method of the invention is started or initialized 301. This step is generally performed by starting or "booting up" the processor. Next, the monitor process is activated 302, by selecting the process monitor program from a menu and indicating that such program should run. The process to be monitored is then selected 303 creating a tie-in between the process monitor and the process to be monitored. A test is performed to determine if the process is actively running in the computer 304, if it is then a second test is performed to determine if the process is running normally 305, if it is then the Running 100b process monitor device is selected and displayed on the display device 203. If the process being monitored is active but running only intermittently the Intermittent 100c device is selected and displayed on the display device 203. If, however, the process is not active, then a third test is made as to whether the process stopped normally 308, if it did then the Stopped 100a process monitor device is selected and displayed on the display device 203. If, however, the process halted unexpectedly then the Broken 100d process monitor device is selected and displayed on the display device 203. After each process monitor device 100a–d is selected the process continuously loops to the test as to whether the process is active 304.

I claim:

1. A computer process monitor device comprising:

(A) a generally circular element having a center, an inner edge and an outer edge; and (B) a plurality of leg elements originating at said center of said generally circular element and extending generally radially outward from said center of said generally circular element, wherein said plurality of leg elements are configured in an orientation, said orientation selected from the group consisting of said legs having a single straight member, said legs having a single curved member, said legs having a plurality of connected straight members, and said legs having a plurality of disconnected straight members.

2. A computer process monitor device, as recited in claim 1, wherein each said plurality of leg elements further comprises a single straight member having a first end and a second end and where said first end is positioned at said center of said circular element and where said second end is positioned outside said outer edge of said circular element.

3. A computer process monitor device, as recited in claim 1, wherein each said plurality of leg elements further comprises a single curved member having a first end and a second end and where said first end is positioned at said center of said circular element and where said second end is positioned at said inner edge of said circular element.

4. A computer process monitor device, as recited in claim 1, wherein each said plurality of leg elements further comprises a plurality of straight members connected end to end and wherein said plurality of straight members have an end positioned at said center of said circular element and wherein said plurality of straight members have a second end positioned at said inner edge of said circular elements.

5. A computer process monitor device, as recited in claim 1, wherein each said plurality of leg elements further comprises a straight member having a first end and a second end and a gap forming a discontinuity between said center of said circular element and said inner edge of said circular element.

6. A process for selecting and displaying a computer process monitor device comprising:

(A) initializing a computer processor;

(B) activating a process monitor routine;

(C) selecting a process for monitoring;

(D) testing to see if said process is active;

(E) testing to see if said process is running normally;

(F) testing to see if said process is stopped normally; and (G) displaying the appropriate process monitor device, wherein said appropriate process monitor device is selected from the group consisting of a stopped process indicator device, a process running indicator device, a process running intermittently indicator device, and a process unexpectedly halted indicator device.

* * * * *